UNITED STATES PATENT OFFICE.

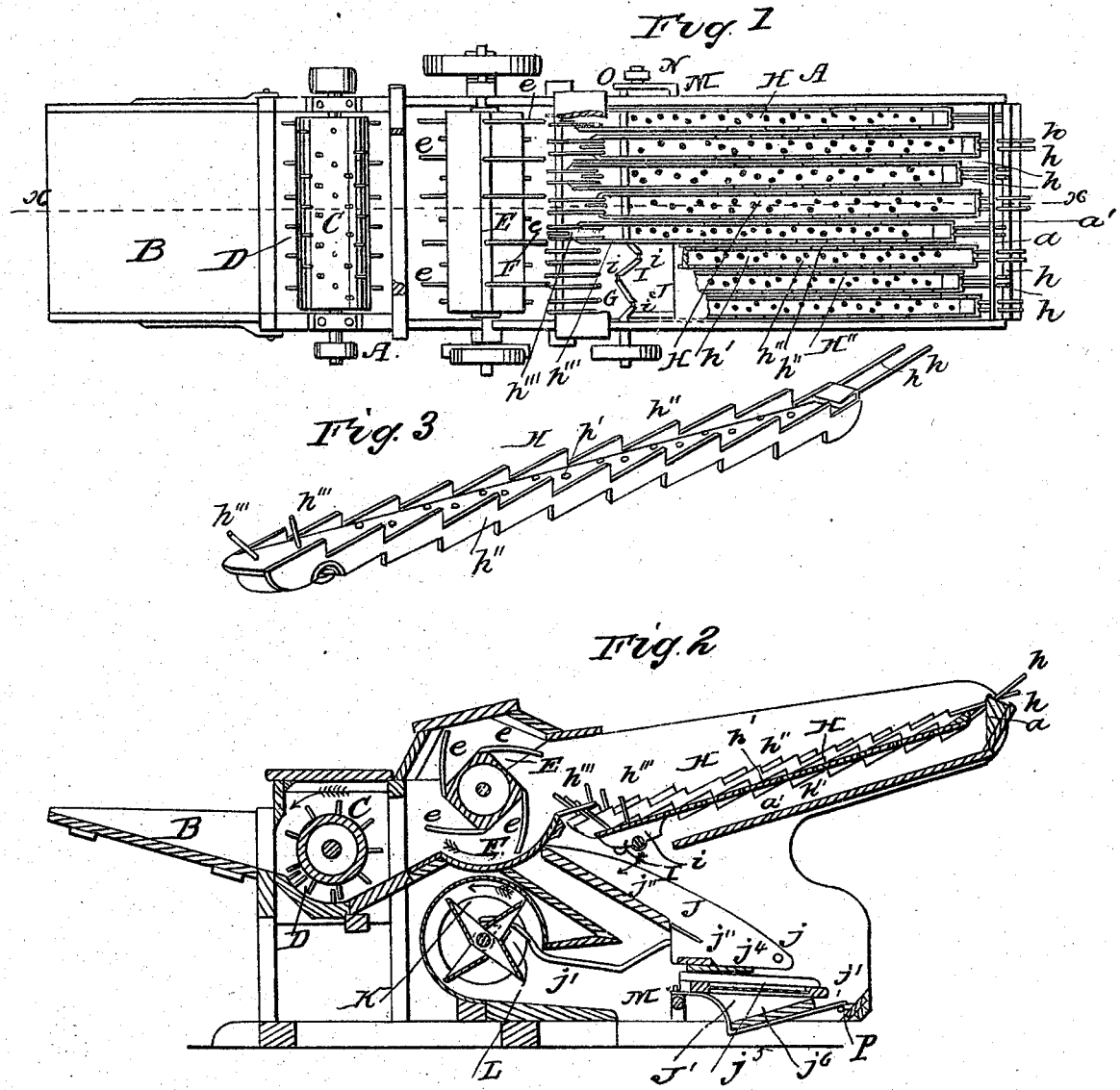

JOHN W. CARDWELL, OF RICHMOND, VIRGINIA, ASSIGNOR TO HIMSELF AND SAMUEL FREEDLEY.

IMPROVEMENT IN THRASHER AND SEPARATOR.

Specification forming part of Letters Patent No. 87,540, dated March 9, 1869.

*To all whom it may concern:*

Be it known that I, JOHN W. CARDWELL, of Richmond, in the county of Henrico and State of Virginia, have invented a new and useful Improvement in Combined Thrasher and Separator; and I do hereby declare the following to be a full, clear, and exact description thereof, reference being had to the accompanying drawings, forming part of this specification.

My improvements consist, first, in the construction of the revolving cylinder, which receives the straw from the thrashing-cylinder and delivers it to the straw-carrier, with tangential curved arms, to adapt it to carry the straw without liability of its wrapping thereon or choking; second, in an improved construction of the straw carrier and separator, consisting in forming it of a number of longitudinal undulatory reciprocating troughs or sections having perforated bottoms or floors, and notched edge flanges on both bottom and top, to adapt them to carry the straw up, and the wheat and chaff which pass through the perforations in the bottom or floor down to the fan; third, in the employment of a double shoe, the upper having a jarring motion imparted by means of a notched cam on the fan-shaft, and the lower a vibrating motion, (imparted by a crank and rock-shaft, taking motion from the shaft which operates the straw-carrier,) to adapt it to more effectually separate the grain from any impurities with which it may be mixed.

In the drawings, Figure 1 represents a plan view of my improved machine, with the cylinder-covers removed and certain parts broken away to expose parts below them. Fig. 2 is a longitudinal section on the line $x\ x$, Fig. 1. Fig. 3 is a perspective view of a section of the straw-carrier detached.

A may represent the frame or case, which may be of any suitable form, to admit of the arrangement of parts within it, hereinafter described. B represents the feed-board, which is applied, in the usual manner, at the front of the machine. C is the customary toothed thrashing-cylinder, which revolves in a correspondingly-toothed concave, D, and receives the grain in the straw from the feed-board B. E is a drum or cylinder arranged parallel to and preferably a little above the thrashing-cylinder C, and provided with a suitable number of curved tangential arms, $e$, which receive the partially-separated grain and straw from said cylinder C, and, carrying it over the concave F, which may be either solid or perforated, deliver it over rearwardly-projecting teeth G onto the carrier and separator, the peculiar form of the arms of said cylinder C preventing the straw wrapping on the cylinder or choking.

The carrier and separator consists of eight (more or less) longitudinal sections, H, supported at their front end on a crank-shaft, I, having preferably a separate arm, $i$, for each section, and each arm at a different angle, and at their rear end by a bar, $a$, of the case, said bar extending across the end of the case, and provided with perforations for the reception of a pair of oblique bars or prongs, $h\ h$, on the end of each of the sections, as represented. The rotation of the crank-shaft I thus imparts to the sections a reciprocating undulatory motion, the rear ends of the sections being elevated by the oblique bars $h$ sliding in the bar $a$, thus effectually agitating and conveying the straw at the same time.

The sections H are each composed of a bottom or floor, $h'$, perforated for the passage of the grain and smaller matters through them, and upright sides $h''$, projecting both above and below $h'$, and notched or serrated on both edges, as represented in Figs. 2 and 3, so as to adapt said sections by their motion to carry the straw and larger matter up on the upper side, and the grain, chaff, &c., off of the inwardly-projecting board $a'$ down onto the upper shoe, J. They have also on their upper side, at their front end, upwardly-projecting bars or fingers $h'''$, which serve to clear the straw, &c., out of the teeth G.

The blast is produced by the customary rotary fan K, arranged as represented in Fig. 2. The shaft of this fan is provided with a notched cam, L, by which the upper shoe, J, which is pivoted at $j$, has imparted to it, through an arm or lever, $j'$, projecting rigidly from its loose end, a jarring motion, by which to discharge the grain off of said upper shoe onto the lower shoe, J', which receives a motion similar to that imparted to the carriers through a rock-shaft, M, which also supports its front end, and a connecting-rod, N, from a crank, O, on the carrier crank-shaft I, its extended inclined sole $j'$ sliding on a pin, P, on the side of the case.

The upper shoe, J, is constructed with an imperforate inclined surface, $j''$, onto which the grain, &c., is discharged from the chute $a'$, and which terminates in a series of bars or fingers, $j'''$, and also a bottom board, $j^4$, onto which the grain falls from the board $j'$ through the blast of the fan, preparatory to its discharge onto the screen $j^5$ of the lower shoe, J', through which screen the grain drops onto another inclined board, $j^6$, from which it is discharged in a thoroughly-cleaned condition in a heap on the ground, or in a suitable receptacle, the chaff, &c., passing out at the open rear end of the machine.

The various rotating shafts of the machine are connected by suitable belting in such a manner as to cause them to rotate, at the usual relative speed, in the direction indicated by the arrows in Fig. 2.

Having described my invention, the following is what I claim as new and desire to secure by Letters Patent:

1. I claim the revolving cylinder E, constructed with the curved tangential arms $e$, and interposed between the thrashing-cylinder C and separator H H, in connection with the separate concave F, substantially as and for the purpose set forth.

2. I claim the straw carrier and separator, composed of the troughs or sections H, constructed with the perforated bottoms or floors $h'$ and notched edge flanges or sides $h''$, and operating substantially in the manner described, for the purposes specified.

3. I claim the double shoe J J', constructed and operated substantially as and for the purpose described.

4. I claim operating the upper shoe, J, by means of the notched cam L on the cam-shaft through the arm or lever $j$, as described.

5. I claim operating the lower shoe, J', by means of the crank-shaft M, connecting-rod N, and crank O on the carrier crank-shaft I, as specified.

To the above specification of my improvement in thrashers and separators I have signed my hand this 5th day of January, 1869.

J. W. CARDWELL.

Witnesses:
S. FREEDLEY,
E. T. TALIAFERRO.